United States Patent
Tateno

(10) Patent No.: US 7,501,035 B2
(45) Date of Patent: Mar. 10, 2009

(54) METHOD OF MANUFACTURING REPLICA DIFFRACTION GRATING

(75) Inventor: Ryo Tateno, Kyoto (JP)

(73) Assignee: Shimadzu Corporation, Kyoto-Shi, Kyoto (JP)

( * ) Notice: Subject to any disclaimer, the term of this patent is extended or adjusted under 35 U.S.C. 154(b) by 306 days.

(21) Appl. No.: 11/149,242

(22) Filed: Jun. 10, 2005

(65) Prior Publication Data

US 2006/0061866 A1 Mar. 23, 2006

(30) Foreign Application Priority Data

Sep. 17, 2004 (JP) ............................. 2004-270651

(51) Int. Cl.
| | |
|---|---|
| B44C 1/175 | (2006.01) |
| B32B 27/06 | (2006.01) |
| B32B 27/16 | (2006.01) |
| B32B 37/10 | (2006.01) |
| B32B 37/12 | (2006.01) |
| B32B 37/14 | (2006.01) |
| C09J 5/04 | (2006.01) |
| B29C 44/06 | (2006.01) |
| B29C 65/48 | (2006.01) |
| C08J 7/04 | (2006.01) |
| B32B 37/06 | (2006.01) |
| B32B 37/16 | (2006.01) |
| B65C 9/25 | (2006.01) |
| H01L 21/302 | (2006.01) |

(52) U.S. Cl. .................. 156/236; 156/244.27; 156/280; 156/289; 156/323; 164/235; 164/249; 264/45.1; 264/241; 264/293; 427/473; 427/512; 216/20; 438/691; 438/700

(58) Field of Classification Search .................. 164/235, 164/249; 156/244.27, 242, 295, 323, 358, 156/280.8, 28.8, 289, 236; 65/45; 264/45.1, 264/241, 293; 427/473, 512; 216/6, 13, 216/16, 18, 20, 22, 44, 49; 438/691, 700; 359/558–576

See application file for complete search history.

(56) References Cited

U.S. PATENT DOCUMENTS 5,374,668 A * 12/1994 Kanemura et al. .......... 523/451

(Continued)

FOREIGN PATENT DOCUMENTS

JP 07-146405 6/1995

(Continued)

OTHER PUBLICATIONS

"Novec EGC-1720: Electronic Coating." 3M Company. St. Paul, MN. <http://solutions.3m.com/wps/portal/!ut/p/kcxml/04_Sj9SPykssy0xPLMnMz0vM0Q9KzYsPDdaP018yizeIN_Q00C_IcFQEAOmQxSM!>.*

(Continued)

Primary Examiner—Philip C Tucker
Assistant Examiner—Sonya Mazumdar
(74) Attorney, Agent, or Firm—Manabu Kanesaka

(57) ABSTRACT

A method of manufacturing a replica diffraction grating includes the steps of: forming a metal thin film on a grating surface of a master diffraction grating, adhering a replica substrate to the metal thin film via an adhesive, and removing the replica substrate so that the metal thin film in a reverse state is adhered on the replica substrate. In the method, before forming the metal thin film on the grating surface of the master diffraction grating, the grating surface is coated with a fluorine surface treating agent as a release agent. Then, the metal thin film is formed with vacuum vapor deposition.

6 Claims, 2 Drawing Sheets

U.S. PATENT DOCUMENTS 6,460,245 B1 * 10/2002 DiStefano .................... 29/840

FOREIGN PATENT DOCUMENTS

JP 07-261010 10/1995

OTHER PUBLICATIONS

"Novec EGC-1720: Electronic Coating." 3M Company. St. Paul, MN. No date available.*

* cited by examiner

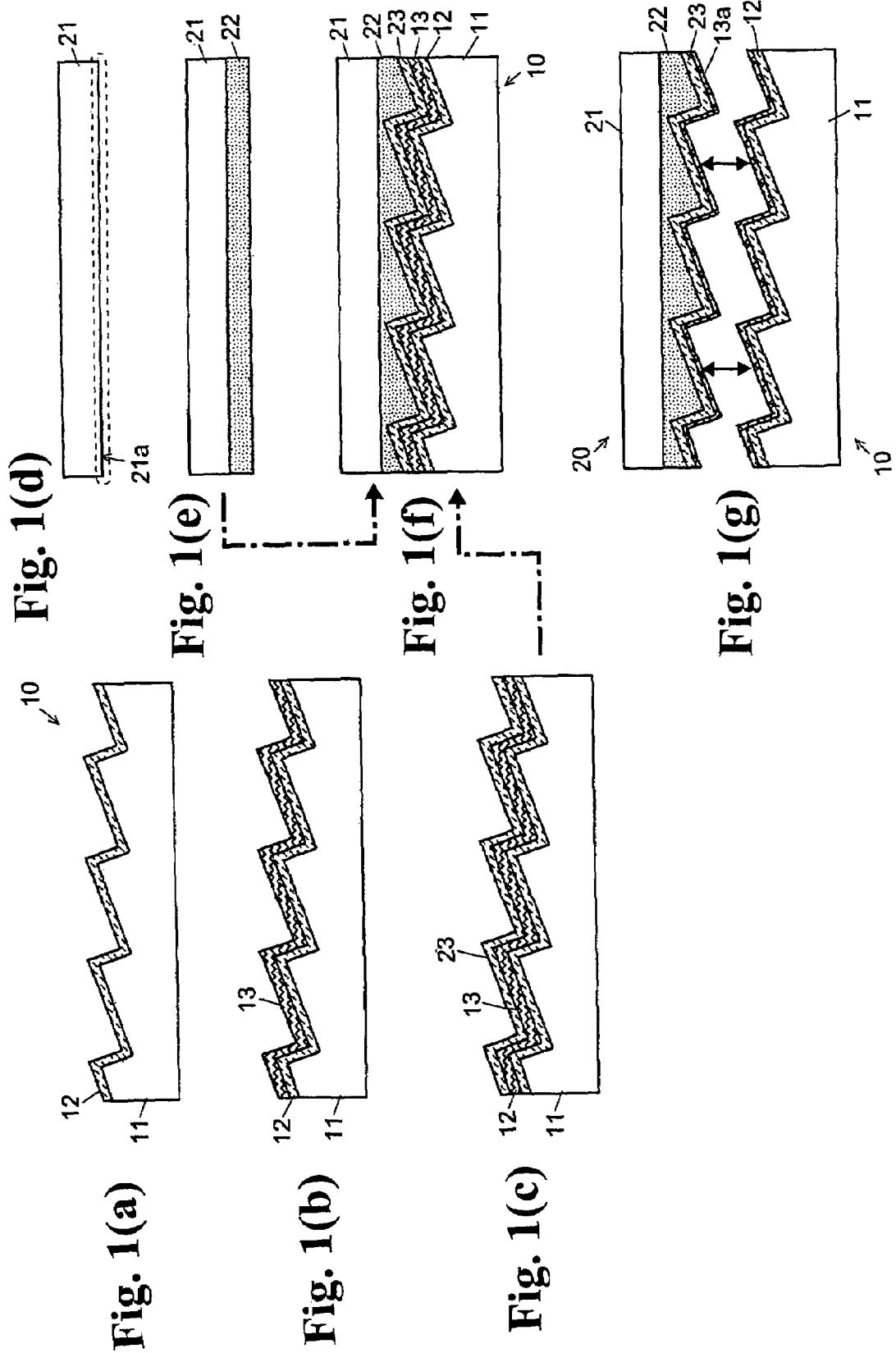

METHOD OF MANUFACTURING REPLICA DIFFRACTION GRATING

BACKGROUND OF THE INVENTION AND RELATED ART STATEMENT

The present invention relates to a method of manufacturing a replica diffraction grating which is used in a spectrophotometer or the like.

Conventionally, when a large number of diffraction gratings are produced, a replica diffraction grating is produced from a master diffraction grating. Such a method will be explained with reference to Patent Documents 1 and 2.

First, a thin film of metal such as aluminum is deposited on a surface of a glass substrate, and grating slits are etched in the thin film to form a master diffraction grating. With the master diffraction grating as a parent mold, silicone grease is thinly coated on a grating surface as a release agent to form an oil film, and a thin film of metal such as aluminum is formed on the oil film with vacuum vapor deposition. A glass substrate (replica substrate) is adhered to the metal thin film via an adhesive such as an epoxy resin, and the replica substrate is removed from the parent mold after curing the adhesive. Accordingly, the metal thin film having the grating slits is transferred to the replica substrate in a reverse form, and the replica diffraction grating is completed.

In the method described above, the release agent is used so that the replica substrate is easily removed from the parent mold. A film layer of the release agent is present between the grating surface of the master diffraction grating and the metal thin film serving as the replica diffraction grating surface. Accordingly, if the film layer is not uniform, the releasing property becomes poor. If the releasing property is degraded, it is difficult to transfer the grating surface from the master diffraction grating to the replica diffraction grating. In particular, when fine size grating slits called nano-imprint are transferred, degradation of the releasing property tends to be linked to lowering precision of the grating surface. Accordingly, it is difficult to obtain a wavelength scattering-characteristic of the replica diffraction grating as designed.

Patent Document 1: Japanese Patent Publication (Kokai) No. 07-146405

Patent Document 2: Japanese Patent Publication (Kokai) No. 07-261010

In view of the problems described above, an object of the present invention is to provide a method of manufacturing a replica diffraction grating in which a grating surface of a master diffraction grating can be transferred to a grating surface of a replica diffraction grating with good precision.

Further objects and advantages of the invention will be apparent from the following description of the invention.

SUMMARY OF THE INVENTION

In order to attain the objects described above, according to the present invention, a method of manufacturing a replica diffraction grating includes the steps of: forming a metal thin film on a grating surface of a master diffraction grating, adhering a replica substrate to the metal thin film via an adhesive, and removing the replica substrate so that the metal thin film in a reverse state is adhered on the replica substrate. In the method, before forming the metal thin film on the grating surface of the master diffraction grating, the grating surface is coated with a fluorine surface treating agent as a release agent. Then, the metal thin film is formed with vacuum vapor deposition.

In the method of manufacturing a replica diffraction grating according to the present invention, a fluorine surface treating agent is used as the release agent, whereas an oil release agent such as silicone grease is used in a conventional method. The fluorine surface treating agent includes, for example, Novec EGC-1720 (manufactured by Sumitomo 3M Ltd.), or the like. The fluorine surface treating agent lowers a surface energy, thereby improving releasing property. Further, a chemically inactive protective layer is formed on the grating surface of the replica diffraction grating, thereby improving anti-fouling property, wear resistance, chemical resistance, and the like.

In the method of manufacturing a replica diffraction grating according to the present invention, it is easy to remove the replica substrate with the metal thin film having the grating slits from the master diffraction grating or the parent mold. Accordingly, it is possible to accurately transfer the grating slits. In particular, even when the grating slits have a small interval size, it is still possible to accurately transfer. Accordingly, it is possible to a large number of replica diffraction gratings having a characteristic same as that of the master diffraction grating with low cost.

BRIEF DESCRIPTION OF THE DRAWINGS

FIGS. 1(a) to 1(g) are schematic sectional views showing a method of manufacturing a replica diffraction grating according to the present invention.

DETAILED DESCRIPTION OF PREFERRED EMBODIMENTS

Figure 2A:
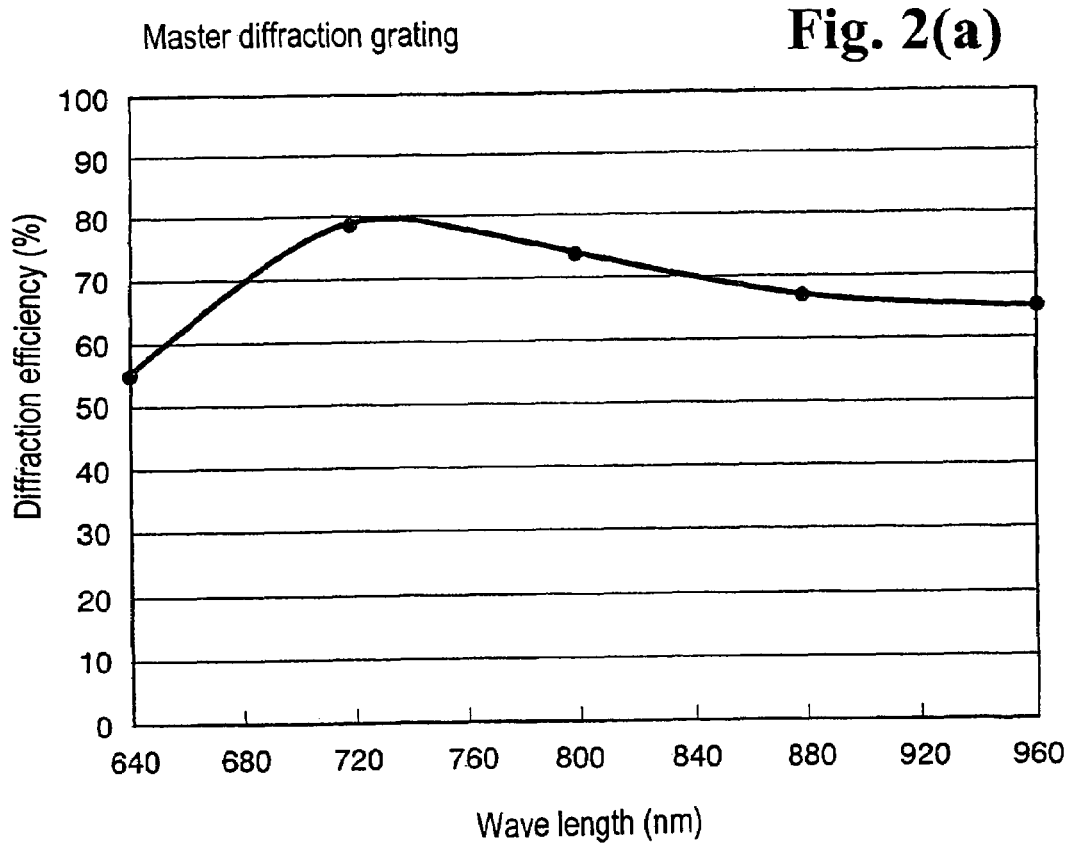
FIGS. 2(a) and 2(b) are graphs showing results of diffraction efficiency measurement of a master diffraction grating and a replica diffraction grating manufactured by the method according to the present invention.

Hereunder, embodiments of the present invention will be explained with reference to the accompanying drawings. FIGS. 1(a) to 1(g) are schematic sectional views showing a method of manufacturing a replica diffraction grating according to the present invention.

First, a master diffraction grating is fabricated. A photo-resistor is coated on a planar substrate 11 formed of an inorganic material such as glass, quartz glass (SiO2), or the like. A portion of the photo-resistor corresponding to grating slits is removed by holographic exposure or the like. With the resist pattern as a master pattern, grating slits are etched by ion beam etching or the like, so that a sectional shape of the slits becomes a saw-tooth shape having a prescribed blaze angle. The grating slits may be mechanically etched rather than the ion beam etching. A metal thin film 12 formed of aluminum, gold, platinum, or the like, having a film thickness of about 0.2 µm is formed on the grating slits with vacuum vapor deposition. Accordingly, a master diffraction grating 10 with the grating slits coated with the metal thin film 12 is formed (FIG. 1(a)).

Next, the grating surface of the master diffraction grating 10 is coated with a fluorine surface treating agent such as Novec EGC-1720 (manufactured by Sumitomo 3M Ltd.) as a release agent to form a release agent layer 13 (FIG. 1(b)). In order to form the release agent layer 13 uniformly, dip coating may be used. An aluminum thin film 23 is formed with vacuum vapor deposition (FIG. 1(c)). The aluminum thin film 23 is for coating the grating surface of the replica diffraction grating, and has a film thickness of, for example, about 0.2 µm.

Next, a replica substrate 21 is prepared (FIG. 1(d)). After cleaning the surface 21a (to be the grating surface) to be coated with an adhesive material 22, the adhesive material 22 formed of a thermosetting resin such as an epoxy resin, a urea resin, a melamine resin, or a phenol resin is coated with an almost uniform thickness (FIG. 1(e)). The replica substrate 21 is preferably formed of a material having low thermal expansion property to suppress a change in an interval between the slits when a temperature rises. A low-thermal expansion crystal glass, for example, such as quartz glass, Zerodur (manufactured by SCHOTT Corporation, registered trademark of Karl Zeiss Company), and the like, can be used. When the diffraction grating is used in an environment having a small temperature increase, a low cost material such as BK7 (a synthetic quartz), PYREX (registered trademark of Corning Company) glass, soda glass, and the like, can be used.

The replica substrate 21 and the master diffraction grating 10 shown in FIG. 1(c) are affixed together via the adhesive material 22 and pushed together by a suitable pressure. Accordingly, the adhesive material 22 spreads so as to fill the slits having a saw-tooth section of the aluminum thin film 23 (FIG. 1(f)). The replica substrate 21 and the master diffraction grating 10 are stored in a baking oven, and heat is applied under a prescribed condition (for example temperature about 70° C.) to accelerate the setting of the adhesive material 22. When the adhesive material 22 is fully set, the replica substrate 21 is peeled off from the master diffraction grating 10 along the release agent layer 13. Accordingly, the aluminum thin film 23 having a saw-tooth section is peeled off in a state adhered to the replica substrate 21 via the adhesive material 22 (FIG. 1(g)). As a result, a replica diffraction grating 20 having grating slits transferred from the grating slits of the master diffraction grating 10 is obtained.

The release agent layer 13 formed of a fluorine surface treating agent lowers surface energy. Accordingly, the replica substrate 21 is peeled from the master diffraction grating 10 with good releasing property. As shown in FIG. 1(g), a portion of the release agent layer remains as a film 13a on the surface of the grating surface of the replica diffraction grating 20. The fluorine surface treating agent is chemically inert, so that the film 13a functions as a protective layer of the grating surface, thereby improving anti-fouling property, wear resistance, chemical resistance, and the like of the grating surface.

Specifically, a replica diffraction grating was fabricated under the following conditions with the manufacturing method described above. The planar substrate of the master diffraction grating is quartz glass having a size of 60 mm×60 mm×11.3 mm, and the photo-resist was 0FPR5000 manufactured by Tokyo Oka. A laser wavelength during the holographic exposure was 441.6 nm, and the etching of the grating slits was performed by ion beam etching. The number of the slits in the grating surface was 1200 lines/mm, and a blaze wavelength was 800 nm. The replica substrate was quartz glass same as the planar substrate and had a size of 60 mm×60 mm×11.3 mm. An epoxy resin was used for the adhesive material.

Figure 2B:
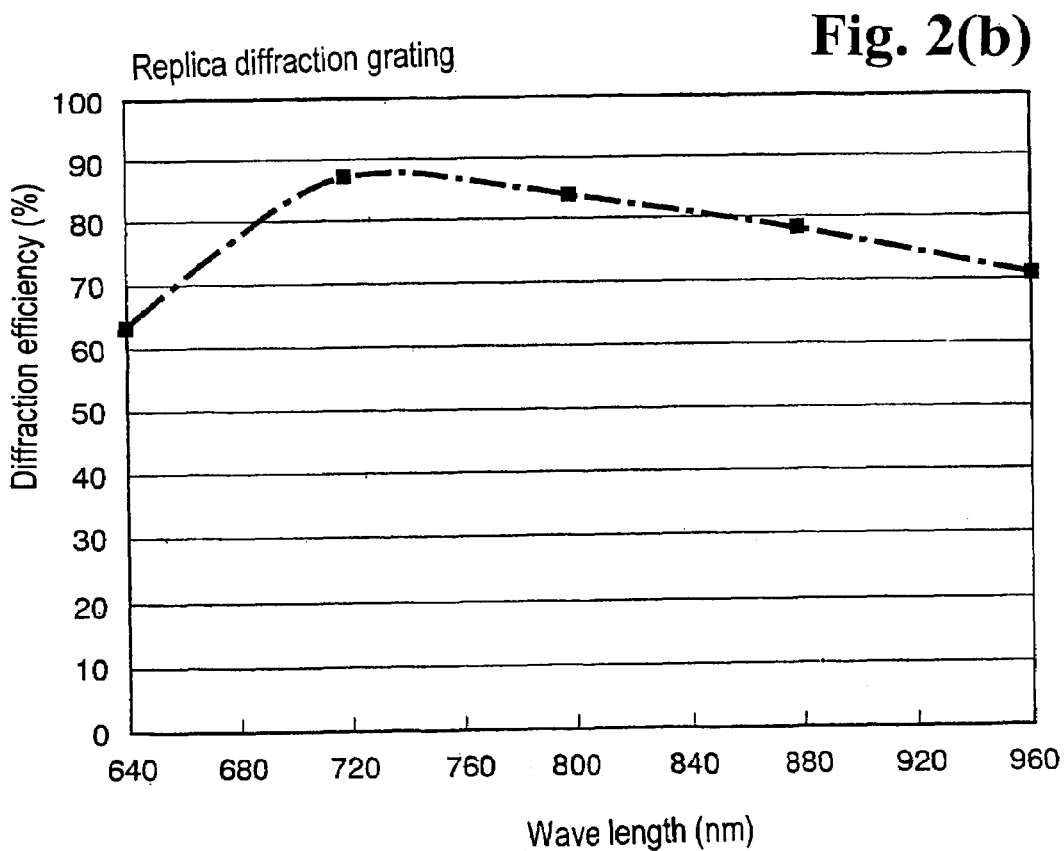

FIGS. 2(a) and 2(b) show results of diffraction efficiency of the master diffraction grating and the replica diffraction grating thus fabricated and measured by a laser interferometer. The master diffraction grating and the replica diffraction grating have the diffraction efficiency having a nearly same curve, indicating that the transfer was accurate. Also, from results of surface precision measurement, it was confirmed that there was almost no deterioration due to the transfer. Concretely, with the manufacturing method according to the present invention, it is possible to manufacture a replica with a master diffraction grating having a high-aspect ratio (a line width is about 1 μm, a depth is about 600 nm) as a parent mold.

The figures and materials in the embodiments are just examples, and the present invention is not limited to the embodiments. Also, modifications and corrections can be performed suitably within the scope of the present invention.

The disclosure of Japanese Patent Application No. 2004-270651, filed on Sep. 17, 2004, is incorporated in the application.

While the invention has been explained with reference to the specific embodiments of the invention, the explanation is illustrative and the invention is limited only by the appended claims.

What is claimed is:

1. A method of manufacturing a replica diffraction grating, comprising:
    coating a fluorine surface treating agent on a grating surface of a master diffraction grating as a peeling agent,
    forming a metal thin film on the grating surface coated with the fluorine surface treating agent with vapor deposition,
    adhering a replica substrate to the master diffraction grating having the metal thin film with an adhesive material, and
    removing the replica substrate from the master diffraction grating in a state that the metal thin film is adhered to the replica substrate.

2. A method of manufacturing a replica diffraction grating according to claim 1, wherein said vapor deposition is vacuum vapor deposition.

3. A method of manufacturing a replica diffraction grating according to claim 2, wherein said master diffraction grating includes a metal layer deposited on the grating surface before the fluorine surface treating agent is coated on the grating surface.

4. A method of manufacturing a replica diffraction grating according to claim 3, wherein said fluorine surface treating agent lowers surface energy, and functions as a protective layer on a grating surface of the replica substrate to thereby improve anti-fouling property, wear resistance and chemical resistance.

5. A method of manufacturing a replica diffraction grating, comprising:
    coating a fluorine surface treating agent on a grating surface of a master diffraction grating as a peeling agent,
    forming a metal thin film on the grating surface coated with the fluorine surface treating agent with vapor deposition,
    adhering a replica substrate to the master diffraction grating having the metal thin film with an adhesive material, and
    removing the replica substrate from the master diffraction grating in a state that the metal thin film is adhered to the replica substrate, a part of said fluorine surface treating agent remaining as a film on a surface of the metal thin film of the replica diffraction grating in removing the replica substrate.

6. A method of manufacturing a replica diffraction grating according to claim 5, wherein said fluorine surface treating agent is chemically inert so that the film of the fluorine surface treating agent functions as a protective layer of the grating surface of the replica diffraction grating.

* * * * *